US011319190B2

(12) United States Patent
Park et al.

(10) Patent No.: US 11,319,190 B2
(45) Date of Patent: May 3, 2022

(54) PASSENGER CONVEYANCE SYSTEM

(71) Applicant: Otis Elevator Company, Farmington, CT (US)

(72) Inventors: Chan-Jong Park, Vienna (AT); Wilfrid Fuchs, Niederosterreich (AT); Philipp Schedl, Vienna (AT)

(73) Assignee: OTIS ELEVATOR COMPANY, Farmington, CT (US)

( * ) Notice: Subject to any disclaimer, the term of this patent is extended or adjusted under 35 U.S.C. 154(b) by 0 days.

(21) Appl. No.: 17/117,920

(22) Filed: Dec. 10, 2020

(65) Prior Publication Data
US 2021/0179391 A1   Jun. 17, 2021

(30) Foreign Application Priority Data
Dec. 11, 2019 (EP) ................................. 19215161

(51) Int. Cl.
  *B66B 25/00* (2006.01)
  *G01B 7/31* (2006.01)
  *B66B 23/02* (2006.01)

(52) U.S. Cl.
  CPC ............ *B66B 25/006* (2013.01); *B66B 25/00* (2013.01); *G01B 7/31* (2013.01); *B66B 23/02* (2013.01)

(58) Field of Classification Search
  CPC ......... G01B 7/31; B66B 25/006; B66B 25/00; B66B 29/00; B66B 23/02; B66B 23/026; B65G 43/02; B65G 23/44
  USPC .............. 198/323, 30, 502.1, 810.03, 810.04
  See application file for complete search history.

(56) References Cited

U.S. PATENT DOCUMENTS

| | | | | |
|---|---|---|---|---|
| 6,886,667 B2 * | 5/2005 | Kunz | .................... | B66B 1/3492 187/394 |
| 7,861,843 B2 * | 1/2011 | Aulanko | ................. | B66B 25/00 198/322 |
| 10,145,770 B2 * | 12/2018 | Frost | ........................ | G01N 3/56 |
| 10,850,948 B2 * | 12/2020 | Ladi | ........................ | B66B 29/00 |
| 2004/0226805 A1 * | 11/2004 | Lodge | .................... | B65G 43/02 198/810.02 |

(Continued)

FOREIGN PATENT DOCUMENTS

| | | |
|---|---|---|
| EP | 0523971 A1 | 1/1993 |
| EP | 1464919 A1 | 10/2004 |

(Continued)

OTHER PUBLICATIONS

European Search Report for Application No. 19215161.1; dated Jun. 23, 2020; 7 Pages.

*Primary Examiner* — James R Bidwell
(74) *Attorney, Agent, or Firm* — Cantor Colburn LLP

(57) ABSTRACT

A passenger conveyance system (2, 102, 202) is provided which includes a first component (12, 112, 212) arranged to rotate about a first rotation axis $A_1$ and a second component (16, 116, 216) arranged to rotate about a second rotation axis $A_2$; at least one magnet (20, 120, 220); and at least one sensor (24, 124, 224). Either the at least one sensor (24, 124, 224) or the at least one magnet (20, 120, 220) is fixed to the first component (12, 112, 212). The sensor (24, 124, 224) is arranged to measure a displacement to the at least one magnet (12, 112, 212), and the system (2, 102, 202) is arranged to use the measured displacement to determine information indicative of the alignment of the first and second components (12, 112, 212; 16, 116, 216).

15 Claims, 9 Drawing Sheets

(56) References Cited

U.S. PATENT DOCUMENTS

| | | | | |
|---|---|---|---|---|
| 2012/0125736 A1* | 5/2012 | Twigger | ................ | B65G 43/06 |
| | | | | 198/502.1 |
| 2020/0031630 A1* | 1/2020 | Park | ........................ | B66B 23/14 |
| 2020/0079623 A1* | 3/2020 | Ladi | ........................ | B66B 23/04 |

FOREIGN PATENT DOCUMENTS

| | | | | |
|---|---|---|---|---|
| EP | 1850087 A1 | 10/2007 | | |
| EP | 3599212 | * 1/2020 | ............ | B66B 25/00 |
| JP | 2018158817 A | 10/2018 | | |

* cited by examiner

PASSENGER CONVEYANCE SYSTEM

FOREIGN PRIORITY

This application claims priority to European Patent Application No. 19215161.1, filed Dec. 11, 2019, and all the benefits accruing therefrom under 35 U.S.C. § 119, the contents of which in its entirety are herein incorporated by reference.

TECHNICAL FIELD

The present disclosure relates to passenger conveyance systems and to methods of monitoring such systems.

BACKGROUND

Passenger conveyance systems such as escalators, moving walkways or elevators typically include multiple rotating components, such as drive sprockets or pulleys. The relative alignment of rotating components is often important. For example, it may be important to maintain two sprockets of a passenger conveyance system (e.g. a drive machine output sprocket and a main drive sprocket of an escalator) to be precisely coplanar, or to maintain two flanged couplers (e.g. connected to a drive machine and a gearbox respectively) to be precisely coaxial. Misaligned components can lead to inefficiencies or even failures.

Conventionally, the alignment of rotating components is checked manually, for example by using a feeler gauge to physically check the separation between two supposedly coaxial components at several discrete rotation positions. If the measured separation is outside of a predefined tolerance and/or varies as the components are manually rotated this can indicate a misalignment (e.g., where the axis of rotation of one component is misaligned with the axis of rotation of the other component). For components which are aligned in a coplanar manner the feeler gauge can be used to measure the separation between the component and an adjacent fixed structure at different rotational positions.

However, such manual physical checks are slow and can only be done when the conveyance system is non-operational because the components must be stationary for each measurement. This is inconvenient, as the conveyance system must be taken out of operation, and may also fail to detect misalignments that only arise when the system is in operation (i.e. when the components are subject to a passenger load).

SUMMARY

According to a first aspect of the present disclosure there is provided a passenger conveyance system comprising: a first component arranged to rotate about a first rotation axis and a second component arranged to rotate about a second rotation axis; at least one magnet; and at least one sensor; wherein either the at least one sensor or the at least one magnet is fixed to the first component, wherein the sensor is arranged to measure a displacement to the at least one magnet, and the system is arranged to use the measured displacement to determine information indicative of the alignment of the first and second components.

By measuring a displacement from the sensor to the magnet, when one (the one that is fixed to the first component) rotates with the first component and the other is stationary (i.e. does not rotate with the first component), changes to the position and/or orientation of the first component and/or the first rotation axis may be detected (e.g. by comparing the measured displacement to a previous or nominal value). An unexpected displacement may indicate a possible misalignment of the first and second components.

The first and second rotation axes may be arranged (e.g. during an initial installation) to be aligned in a particular way (e.g. to be parallel). However, over time (e.g. an extended period of high passenger load), the first component may become tilted or otherwise displaced such that the first and second rotation axes are no longer properly aligned. By measuring the displacement to the magnet, changes to the position and/or orientation of the first component (and thus to the alignment with the second component) may be detected.

Even with just one sensor and one magnet it may be possible to detect i) angular misalignments, where the relative orientation of the first and second axes of rotation changes from a nominal orientation (e.g. parallel); ii) radial misalignments, where a separation of the respective axes of rotation changes from a nominal separation; and iii) axial misalignments, where the distance between respective planes of rotation of the first and second components (i.e. perpendicular to the axes of rotation) changes from a nominal distance.

Using a magnet and a sensor enables measurements to be made without interfering with normal operation (i.e. rotation of the first and second rotatable components) because no physical contact between the sensor and the magnet (that move relative to each other) is required to make the measurement. Information indicative of the alignment of the first and second components may therefore be determined without needing to shut the system down to do manual measurements (e.g. using a feeler gauge), increasing convenience. Furthermore, the system of the present disclosure enables the detection of misalignments that may only arise under operational conditions (e.g. with a full passenger load). The system also enables the alignment of the first and second components to be continuously monitored (e.g. facilitating condition-based monitoring (CBM) of the passenger conveyance system).

Any type of sensor capable of detecting the displacement to a magnet may be used. However, in some preferred examples the sensor may comprise a magneto-inductive sensor (e.g. a device that uses the principle of electromagnetic induction to measure the displacement). The sensor may be arranged to output a single parameter (e.g. the magnitude of an output voltage) indicative of the displacement of the magnet from the sensor. In some examples, the sensor may be arranged to provide more information, such as a direction to the magnet or displacement/distance information in two or more orthogonal directions. The sensor or the magnet that is not fixed to the first component may be rigidly attached to a stationary structure, e.g., a drive motor casing or a support frame or structure such as an escalator truss.

In some examples where the sensor is fixed to the first component, the sensor may be powered through wireless power transfer (e.g. using inductive coupling between a stationary coil and a coil provided with the sensor and/or through capacitive coupling), to avoid the need for a wired power connection to the moving sensor (as the first component rotates). The sensor may comprise a battery (e.g. that is slowly charged over time through wireless power transfer and/or that is simply replaced when its stored energy is exhausted). The sensor may be arranged to transmit the measured displacement information over a wireless data connection (e.g. according to the Bluetooth or WiFi standards or the like).

In some examples the system is arranged such that the determined displacement is in a direction parallel to the nominal direction(s) of the first and/or second axes of rotation. For instance, the magnet may be fixed to the side of a rotating sprocket at a certain radial distance from the first axis of rotation, and the sensor may be fixed to a stationary structure (e.g. an escalator truss) at a point at the same radial distance from the first axis of rotation (i.e. such that a minimum displacement from the magnet to the sensor as the first component rotates is in a direction parallel to the first axis of rotation).

The magnet or the sensor that is fixed to the first component is preferably fixed at a radially outermost point of the first component, as this point may experience the largest absolute displacement for a given angular misalignment, thus increasing sensitivity to angular misalignments. In some examples the magnet or the sensor may even be fixed to a small limb extending radially outwards from the first component to further increase sensitivity. This may also aid installation, e.g., when there is limited clearance on a face of the first component.

In some examples, the first and second axes of rotation may be (nominally) parallel. However, in other examples the first and second axes of rotation may have other nominal relative orientations (e.g. perpendicular or an oblique angle). For example, the first and second components may comprise bevel gears arranged to engage at a perpendicular or oblique angle.

The first and second components may be (nominally) coaxial (i.e., the first and second rotation axes may be arranged on installation to be coincident). For example, the first and second components may comprise first and second flanged couplers (e.g. connected together to couple two drive machines or to couple a drive machine to a gearbox). In such examples, misalignments (e.g. angular, radial and/or axial misalignments) between the first and second flanged couplers may result in inefficient coupling and damage to or even failure of the couplers or parts to which they are coupled.

In some examples, the first and second axes of rotation may be parallel but the first and second components are not coaxial. The first and second components may be (nominally) coplanar (i.e., where the first and second axes of rotation are parallel and extend perpendicular to a common plane of rotation). For example, the first and second components may comprise first and second sprockets or pulleys. The first and second rotatable components may be coupled by a chain or belt that also travels in the common plane. For instance, the first and second components may comprise respectively a drive machine output sprocket and a main drive sprocket, coupled by a drive chain. In examples featuring nominally coplanar rotatable components, misalignments may result in excessive wear and increased stresses (e.g. on the components and/or on a chain or belt connecting the components), reducing part lifetime and increasing the likelihood of failures.

As explained above, measuring the displacement to just a single magnet can enable misalignments to be detected. However, in some examples, the system may further comprise at least one further magnet, and the system may be arranged to measure a displacement to the further magnet.

For instance, in some examples the magnet is a first component magnet fixed to the first component, and the further magnet may comprise a second component magnet fixed to the second component. In some such examples, the sensor may be arranged to measure a first displacement to the first component magnet and a second displacement to the second component magnet (i.e. a single common sensor may be used to measure a displacement to both magnets). For instance, in examples where the first and second components are coaxial or overlap, the first component magnet and the second component magnet may be arranged to travel past or near to a mutual stationary point as the first and second components rotate. A common sensor may be positioned at or near this point to enable the measurement of a displacement to both magnets. For example, the first and/or second component magnets may be fixed to the first and/or second components respectively at a point past a radially outermost edge of the first and/or second components (e.g. on a small limb extending radially outwards from the first and/or second components), to avoid one magnet being shielded from the common sensor by the first or second component itself.

In some examples, however, the sensor may comprise a first component sensor (i.e. arranged to measure a displacement only to the first component magnet) and the system may further comprise a second component sensor arranged to measure a displacement to the at least one second component magnet.

In some examples the system may comprise a plurality of sensors each arranged to measure displacement to the magnet (and, in relevant examples, to measure a displacement to the further magnet). The sensors may be positioned to measure a displacement to the magnet at different points as the first component rotates. Preferably, the plurality of sensors are fixed to a stationary structure (e.g. an escalator truss), and the magnet is fixed to the first component. This may enable the position and/or the axis of rotation and/or the plane of rotation of the first component to be more precisely determined, thus facilitating the detection of misalignments. In examples featuring a first component sensor and a second component sensor, the system may of course comprise a plurality of first component sensors and/or a plurality of second component sensors.

In some examples featuring a plurality of sensors, the sensors may be positioned at different angular points about the first and/or second axis of rotation. Although these need not be symmetrically arranged, these points may in some examples be located equiangularly about the first and/or second axis of rotation. In some examples, for instance, the system may comprise two sensors positioned at two points that are separated by approximately 180° about the first axis of rotation (i.e. at roughly opposite points relative to the first axis of rotation). In such examples the magnet passes a sensor (and a displacement is measured) with each half rotation of the first component.

In some examples, the system may comprise three or more sensors each arranged to determine a displacement to the magnet. In examples where the magnet is fixed to the first component (i.e. when the magnet comprises a first component magnet), the use of at least three sensors may ensure that the position and/or axis of rotation and/or plane of rotation of the first component can be accurately determined. The sensors may be positioned at three points separated by approximately 120° about the first axis of rotation. It will be appreciated that in other examples four or more sensors may be used. However, as three sensors should be sufficient to determine the plane of rotation of the component, some examples may have exactly three sensors.

The system may comprise a plurality of magnets fixed to the first component (i.e. a plurality of first component magnets). In such examples the sensor may be arranged to measure a displacement to each of the plurality of first component magnets and the measured displacement to each of the plurality of first component magnets may be used to determine the information indicative of the alignment of the first and second components. For example, the system may comprise two first component magnets positioned on opposite sides (i.e. with respect to the first axis of rotation) of the first component. In examples featuring at least one second component magnet the system may of course comprise a plurality of second component magnets fixed to the second component at a plurality of positions. The use of a plurality of first and/or second component magnets may enable the detection of damage to or deformations of the first and/or second component.

In some examples, the first and second components may have the same size and/or shape (e.g. the first and second components may comprise substantially identical flanged couplers). However, in other examples the first and second components may have different sizes and/or shapes (e.g. in examples where the first and second components comprise sprockets with different diameters).

The information indicative of the alignment between the first and second components may simply comprise the measured displacement(s). The information may comprise a binary "aligned/not aligned" indication, e.g. triggered when a measured displacement differs from an expected value by more than a predetermined tolerance. Additionally or alternatively, the information may be more detailed, for instance comprising a comparison of the measured displacement with a nominal displacement or previously measured displacement.

The information may comprise one or more values derived from one or more displacement measurements. For instance, in relevant examples, the system may be arranged to use measured displacements to the first and second components to calculate a relative displacement between the first and second components, which is then compared to a nominal or tolerated value to decide if the components are aligned or misaligned, or to what degree the components are misaligned.

The information may comprise an alignment health score. The information may include separate details on different types of misalignment detected, e.g. angular, axial or radial. For example, there may be pre-defined thresholds for angular, axial and/or radial misalignments (e.g. 90% of a maximum operable misalignment). In some such examples if any type of misalignment exceeds its pre-defined threshold, the information may comprise an alert reminding a technician to perform preventative maintenance. The information may indicate progress towards a maximum operable misalignment, e.g. as a percentage score of the maximum operable misalignment.

The system may comprise a processing device arranged to use the measured displacement(s) to determine the information indicative of the alignment between the first and second components. The processing device may be provided locally (e.g. as part of a local control unit) with the sensors connected thereto either wirelessly or in a wired manner, but in some examples the processing device is provided on a remote server (e.g. as a cloud service). The remote server may be connected to the sensor(s) over the internet (e.g. via a wireless or mobile network).

The system may comprise a monitoring device arranged to output the information (e.g. to a technician at a monitoring centre). The monitoring device may be arranged to output the information via a display.

The monitoring device may be connected to the sensor(s) and/or the processing device over the internet (e.g. via a wireless or mobile network).

According to a second aspect of the present disclosure there is provided a method of monitoring a passenger conveyance system, the passenger conveyance system comprising: a first component arranged to rotate about a first rotation axis and a second component arranged to rotate about a second rotation axis; at least one magnet; and at least one sensor, wherein either the at least one sensor or the at least one magnet is fixed to the first component; the method comprising: measuring a displacement to the at least one magnet using the at least one sensor; and using the measured displacement to determine information indicative of the alignment of the first and second components.

This disclosure also extends to the provision of a magnet and sensor arranged to determine information indicative of the alignment of components of a passenger conveyance system. The present disclosure therefore extends to a monitoring system for a passenger conveyance system comprising a first component arranged to rotate about a first rotation axis and a second component arranged to rotate about a second rotation axis, the monitoring system comprising: at least one magnet; and at least one sensor; wherein either the at least one sensor or the at least one magnet is arranged to be fixed to the first component; wherein the sensor is arranged to measure a displacement to the at least one magnet, and the system is arranged to use the measured displacement to determine information indicative of the alignment of the first and second components.

Features of any example described herein may, wherever appropriate, be applied to any other example described herein. Where reference is made to different examples or sets of examples, it should be understood that these are not necessarily distinct but may overlap.

BRIEF DESCRIPTION OF THE DRAWINGS

Certain examples of the present disclosure will now be described with reference to the accompanying drawings in which.

DETAILED DESCRIPTION

Figure 1:
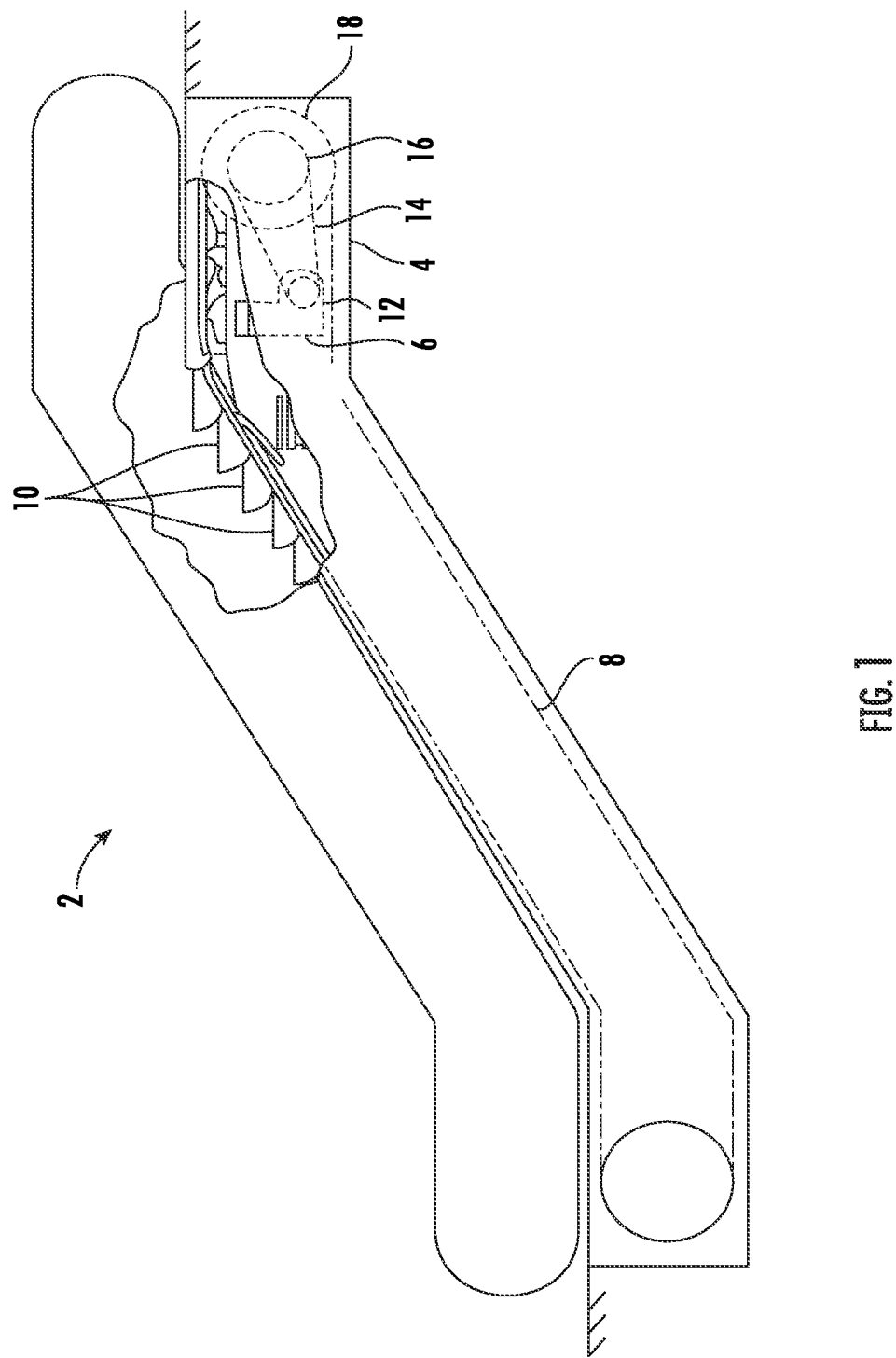
FIG. 1 is a schematic view of a people conveyor system according to an example of the present disclosure.

FIG. 1 shows an example of a people conveyor system in the form of an escalator system 2 comprising a truss 4, a drive motor 6, a step chain 8 and a plurality of steps 10 arranged to carry passengers between upper and lower landing regions of the escalator system 2. The steps 10 are coupled to step chain 8, which runs between the upper and lower landing regions and is driven by the drive motor 6 to drive the steps 10 between the landing regions. Whilst in this example the people conveyor system is an escalator system 2, the present disclosure may of course be applied to other people conveyor systems such as moving walkways or elevators.

The drive motor 6 drives the step chain 8 via a series of sprockets. The drive motor 6 is connected directly to a machine output sprocket 12, which is coupled via a drive chain 14 to a main drive sprocket 16. The main drive sprocket 16 is connected to a step chain sprocket 18 that drives the step chain 8.

Figure 3:
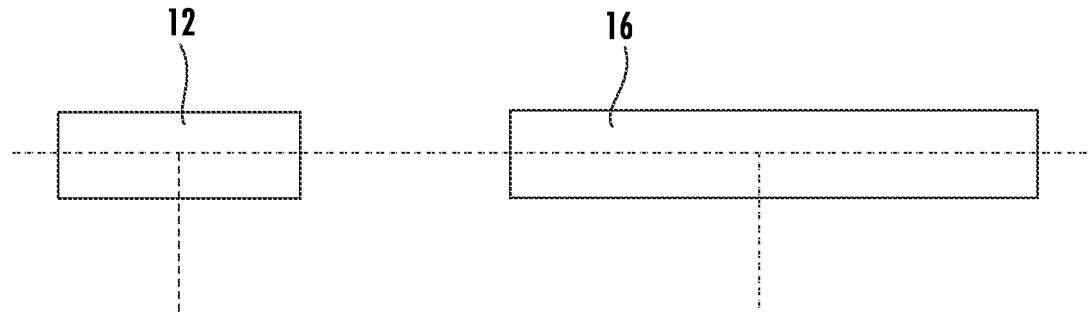
FIG. 3 is a schematic view of two aligned coplanar components.

On installation, the machine output sprocket 12 and the main drive sprocket 16 are aligned to be precisely coplanar (i.e. such that their planes of rotation lie in the same plane), to ensure safe and efficient transfer of drive force from the drive motor 6 to the step chain sprocket 18 (and thus to the step chain 8). It is important that this precise alignment is maintained throughout the lifetime of the escalator system 2. FIG. 3 shows a plan view of the coplanar machine output sprocket 12 and the main drive sprocket 16 when properly aligned.

Figure 2:
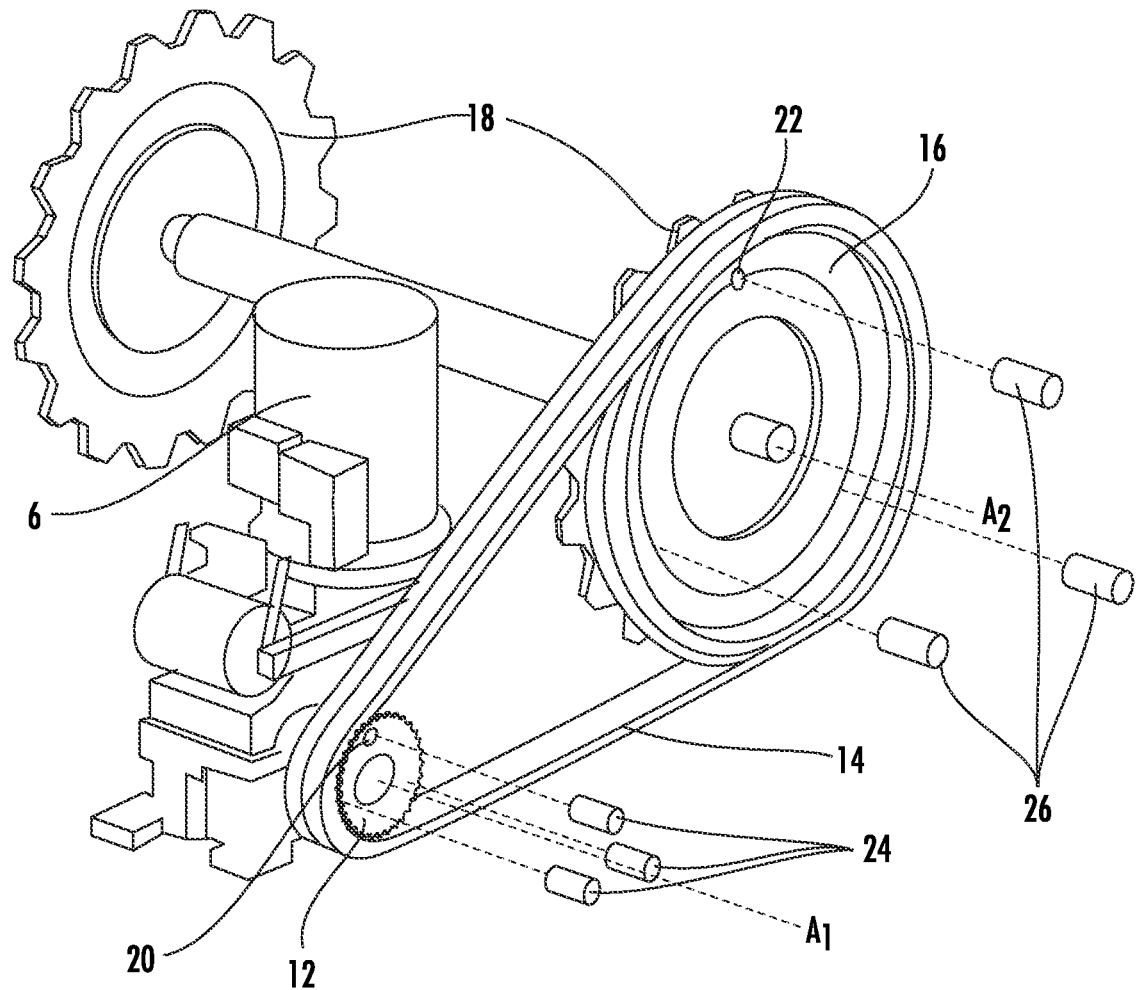
FIG. 2 is a close up partial view of the system of FIG. 1.

A partial close-up view of the escalator system 2, focused on the machine output sprocket 12 and the main drive sprocket 16, is shown in FIG. 2.

As shown in FIG. 2, the machine output sprocket 12 is arranged to rotate about a first axis of rotation $A_1$, driven by the drive motor 6. The main drive sprocket 16 is arranged to rotate about a second axis of rotation $A_2$. The system 2 further comprises a machine output sprocket magnet 20, fixed to one side of the machine output sprocket 12. The escalator system 2 also comprises a main drive sprocket magnet 22, fixed to one side of the main drive sprocket 16.

The escalator system 2 further comprises three first sensors 24 (e.g. magneto-inductive sensors) that are fixed to the truss 4 (not shown in FIG. 2) and positioned to detect a displacement to the machine output sprocket magnet 20 as the machine output sprocket 12 rotates.

The escalator system 2 further comprises three second sensors 26, which are fixed to the truss 4 and are positioned to detect a displacement of the main drive sprocket magnet 22 as the main drive sprocket 16 rotates.

When the machine output sprocket 12 and the main drive sprocket 16 are properly aligned (i.e. when they are coplanar), the displacements measured by the first and second sensors 24, 26 remain within a tolerance of certain preset (e.g. installed) values. Additionally or alternatively, the displacements measured by the first and second sensors 24, 26 can be expected to remain within a tolerance of each other when the components are properly aligned.

Figure 7:
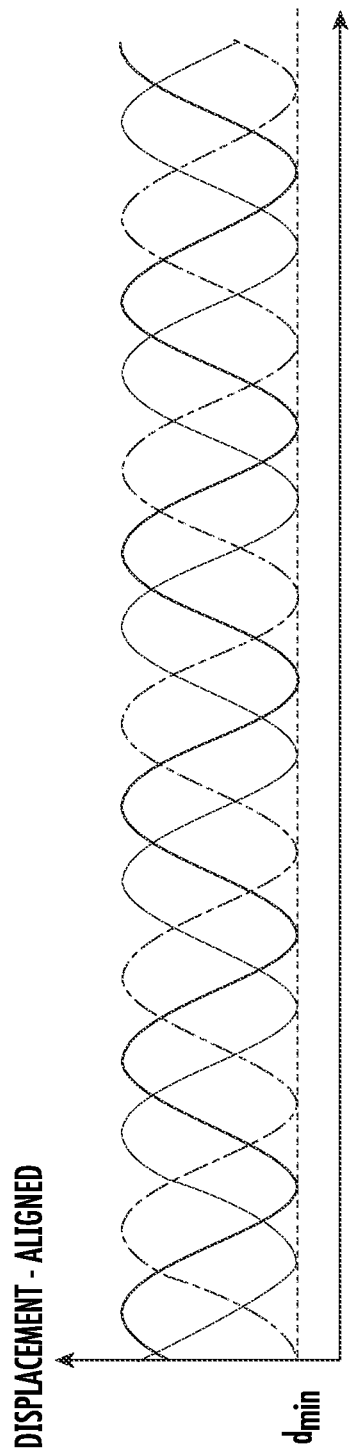
FIG. 7 is a plot of displacements detected by sensors for an aligned component.

FIG. 7 shows an exemplary plot illustrating the displacements for each of the first sensors 24 over time when the machine output sprocket 12 and the main drive sprocket 16 are properly aligned (a similar plot would be generated from the second sensors 26). The outputs of the three sensors 24 are illustrated by a solid line, a dashed line and a dash-dot line. It will be appreciated that these plots are provided for illustrative purposes to explain the principle of use rather than accurately representing actual measurements. As the machine output sprocket 12 rotates, the displacement from the machine output sprocket magnet 20 to each first sensor 24 oscillates (as it approaches the sensor, passes adjacent the sensor and then rotates away from the sensor) but remains within predetermined tolerances (e.g. the minimum displacement does not fall below $d_{min}$).

Figure 4:
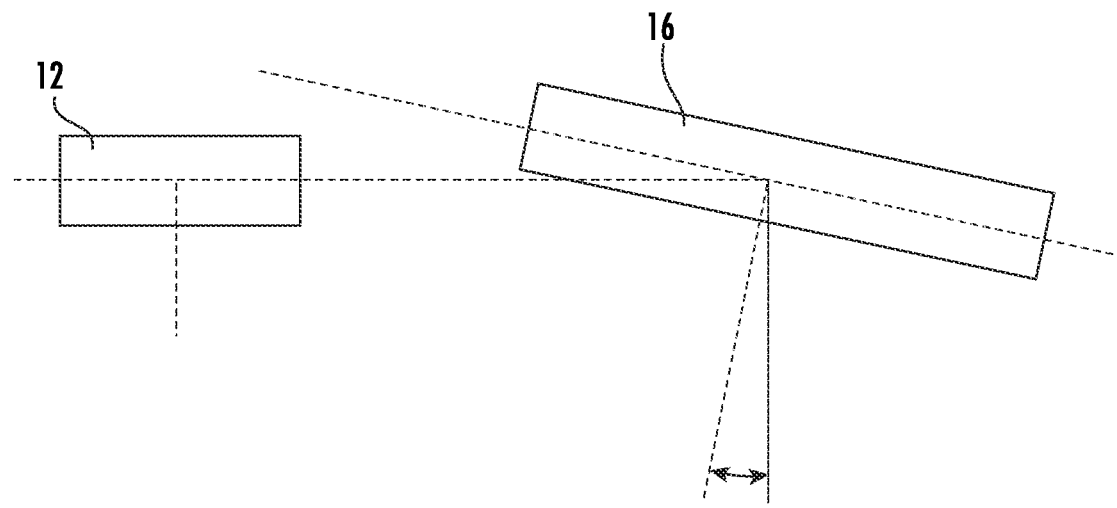
FIGS. 4, 5 and 6 are various schematic views of two misaligned coplanar components.

In use, the machine output sprocket 12 and the main drive sprocket 16 may become misaligned. For example, machine output sprocket 12 or the main drive sprocket 16 may become angularly misaligned, wherein the first axis of rotation A1 and the second axis of rotation A2 are no longer parallel. Such a misalignment is shown in FIG. 4.

Figure 5:
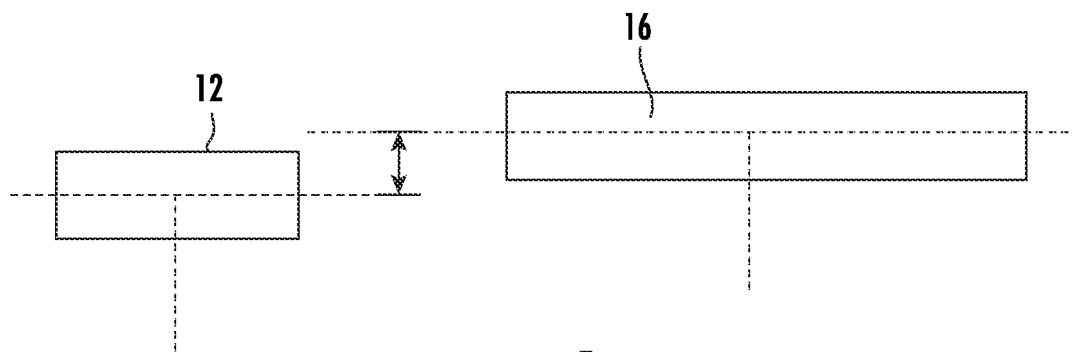
Figure 6:
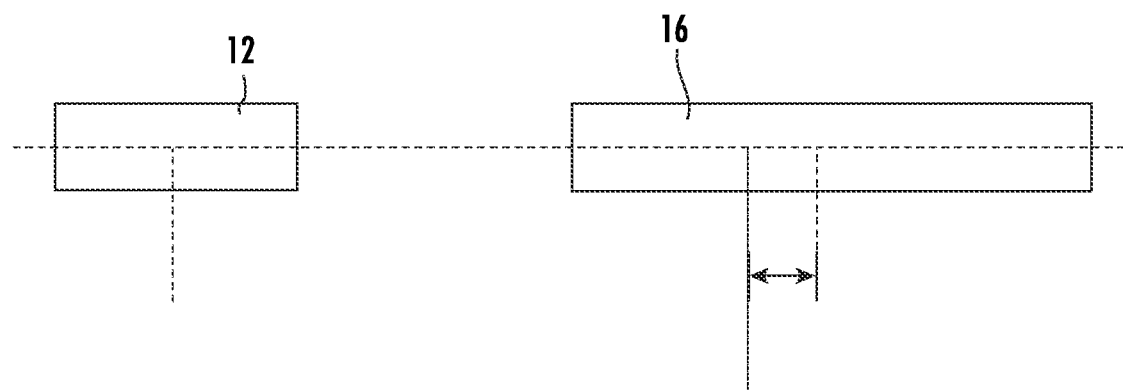

The machine output sprocket 12 or the main drive sprocket 16 may also (or instead) become axially misaligned as shown in FIG. 5, wherein their respective planes of rotation are no longer coincident. The machine output sprocket 12 or the main drive sprocket 16 may also become radially misaligned, where the separation of the first and second axis of rotation changes from a nominal separation, as shown in FIG. 6.

If the sprockets 12, 16 become misaligned (e.g. angularly misaligned), one or more of the displacements measured by the first and second sensors 24, 26 may change.

Figure 8:
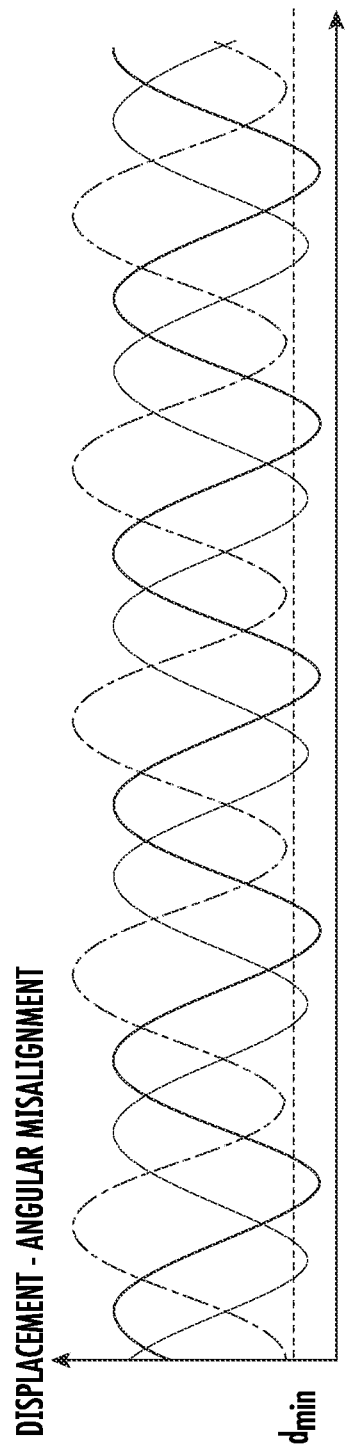
FIG. 8 is a plot of displacements detected by sensors for a misaligned component.

FIG. 8 shows an exemplary plot illustrating the changing displacements for each of the first sensors 24 over time when the machine output sprocket 12 has been tilted such that the machine output sprocket 12 and the main drive sprocket 16 are angularly misaligned. It can be seen that the measured displacement for two of the three sensors 24 drops below $d_{min}$ as the machine output sprocket 12 rotates, indicating a misalignment. It can also readily be seen that the three sensor outputs differ from each other, indicating a tilt rather than a purely axial or radial displacement. By contrast, a radial or axial displacement would be expected to produce the same effect on all sensors (e.g. a uniform increase or reduction in $d_{min}$).

The measured displacements can thus be used to determine information indicative of the alignment (or misalignment) of the machine output sprocket 12 and the main drive sprocket 16 without needing to stop operation of the escalator system 2.

Figure 15:
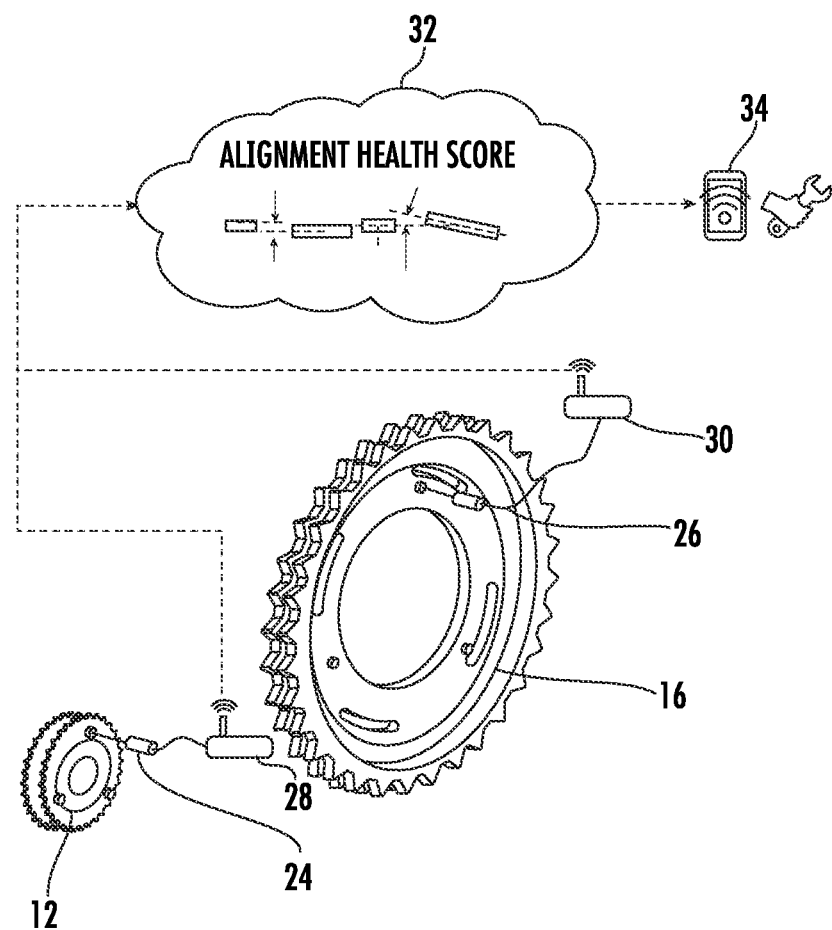
FIG. 15 is a schematic view of a passenger conveyance system according to an example of the present disclosure.

As shown in FIG. 15, the first and second sensors 24, 26 (only one of each is shown in FIG. 15) are connected via transmitters 28, 30 to a remote cloud-based processing device 32. The transmitters 28, 30 transmit the measured displacements to the processing device 32 over a wireless network (although a wired network is equally feasible). The processing device 32 uses the measured displacements to determine information indicative of alignment/mis-alignment (e.g. an alignment health score). This information is then transmitted to a monitoring device 34 which may be arranged to alert a technician if the information indicates a misalignment of the machine output sprocket 12 and/or the main drive sprocket 16.

Figure 9:
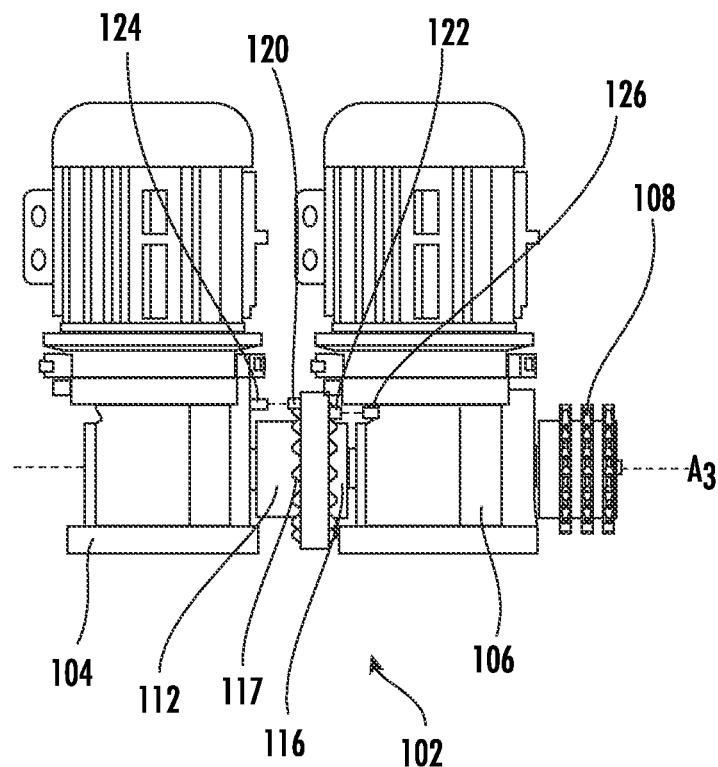
FIGS. 9 and 10 are partial views of escalator systems according to examples of the present disclosure.

FIG. 9 shows a dual drive system 102 of another exemplary escalator system. The dual drive system 102 comprises a first drive motor 104 and a second drive motor 106, which together provide drive force to an output sprocket 108.

The first drive motor 104 and the second drive motor 106 are coupled together. A first flanged coupler 112 is connected to the first drive motor 104, and a second flanged coupler 116 is connected to the second drive motor 106. The first and second flanged couplers 112, 116 are connected together with a plurality of bolts 117.

In order to safely and efficiently couple the first and second drive motors 104, 106 together, the first and second flanged couplers 112, 116 must be aligned to be precisely coaxial with a common axis of rotation $A_3$.

In order to facilitate continuous monitoring (i.e. condition based monitoring) of the alignment of the first and second flanged couplers 112, 116, the system 102 further comprises a first flanged coupler magnet 120 fixed to the first flanged coupler 112 and a first sensor 124 fixed to the first drive motor 104. The system 102 also comprises a second flanged coupler magnet 122 fixed to the second flanged coupler 116 and a second sensor 126 fixed to the second drive motor 106. The first and second sensors 124, 126 are arranged to measure displacements to the first flanged coupler magnet 120 and the second flanged coupler magnet 122 respectively, as the couplers 112, 116 rotate about axis $A_3$. The measured displacements may be used to determine information indicative of the alignment of the first and second flanged couplers 112, 116.

Figure 10:
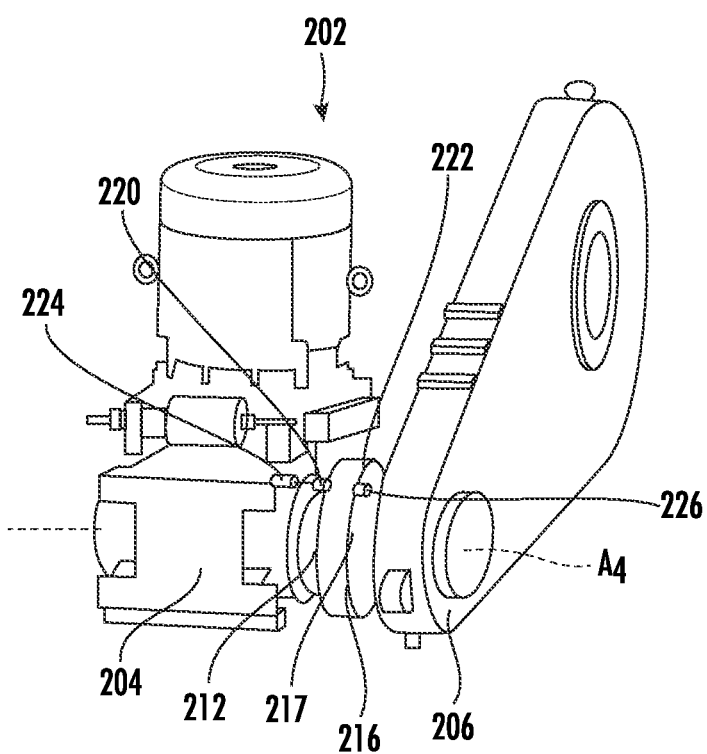

FIG. 10 shows a drive system 202 of another exemplary escalator system. The drive system 202 comprises a drive motor 204 coupled to a gearbox 206. A first flanged coupler 212 is connected to the drive motor 204, and a second flanged coupler 216 is connected to the gearbox 206. The first and second flanged couplers 212, 216 are connected together with a plurality of bolts 217. As with the dual drive system 102 of FIG. 9, it is important that the first and second flanged couplers 212, 216 are aligned to be precisely coaxial with a common axis of rotation $A_4$.

Thus, as with the drive system 102 of FIG. 9, the drive system 202 further comprises a first flanged coupler magnet 220 fixed to the first flanged coupler 212 and a first sensor 224 fixed to the drive motor 204. The system 202 also comprises a second flanged coupler magnet 222 fixed to the second flanged coupler 216 and a second sensor 226 fixed to the gearbox 206. The first and second sensors 224, 226 are arranged to measure displacements to the first flanged coupler magnet 220 and the second flanged coupler magnet 222 respectively, as the couplers 212, 216 rotate about axis $A_4$. The measured displacements may be used to determine information indicative of the alignment of the first and second flanged couplers 212, 216.

Figure 11:
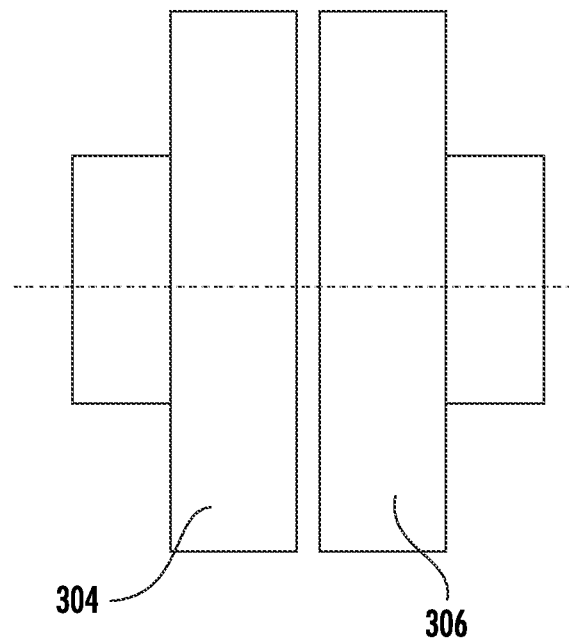
FIG. 11 is a schematic view of two aligned coaxial components.

FIG. 11 shows a schematic view of first and second coaxial components 304, 306 (such as the first and second flanged couplers 112, 116 of FIG. 9 or the first and second flanged couplers 212, 216 of FIG. 10) when properly aligned.

Figure 12:
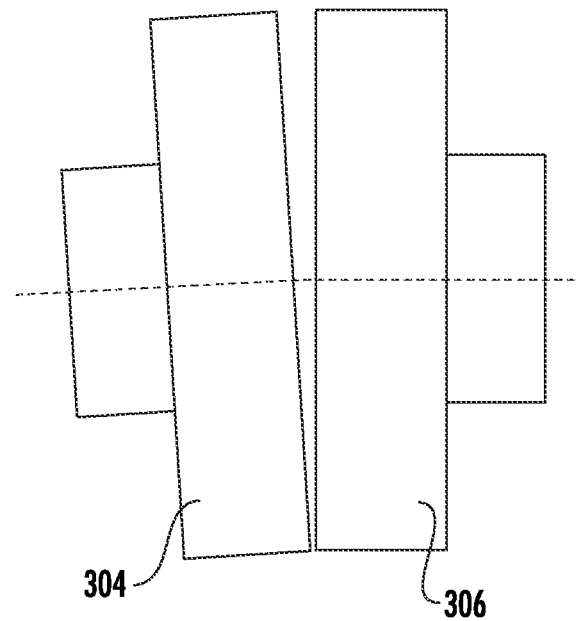
FIGS. 12, 13 and 14 are various schematic views of two misaligned coaxial components.

FIG. 12 shows an example of the first and second coaxial components 304, 306 when angularly misaligned. The first component 304 is tilted such that its axis of rotation is no longer coincident with the axis of rotation of the second component 306.

Figure 13:
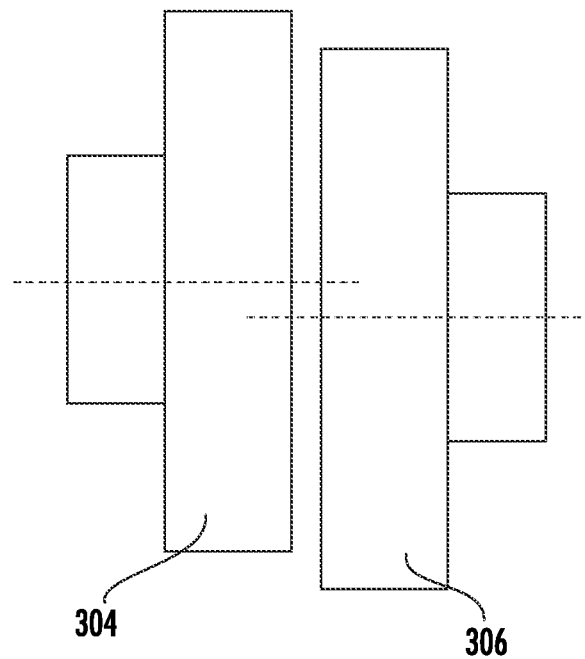

FIG. 13 shows an example of the first and second coaxial components 304, 306 when radially misaligned (meaning that the misalignment is radial with respect to the axis of rotation). The second component 306 is radially offset such that its axis of rotation is no longer coincident with the axis of rotation of the first component 304.

Figure 14:
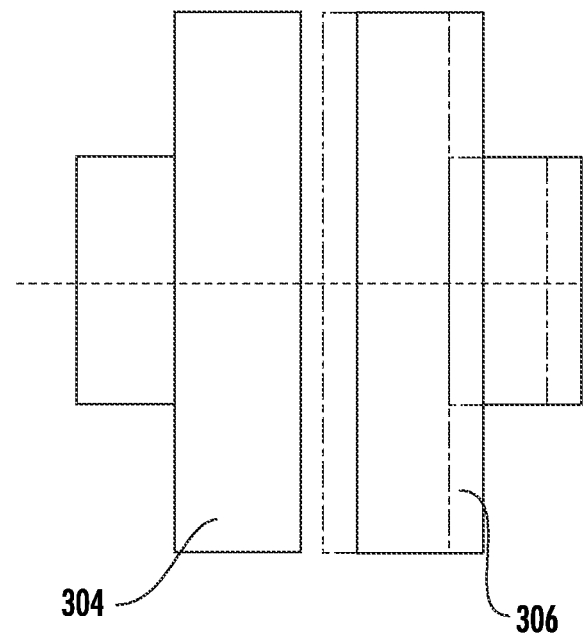

FIG. 14 shows an example of the first and second coaxial components 304, 306 when axially misaligned (meaning that the misalignment is in the direction of the axis of rotation). The second component 306 is axially offset such that the distance between the planes of rotation of the first and second components 304, 306 is no longer the correct distance for optimal operation (the correct position of the second component 306 is shown with a dot-dashed line).

While the disclosure has been described in detail in connection with only a limited number of examples, it should be readily understood that the disclosure is not limited to such disclosed examples. Rather, the disclosure can be modified to incorporate any number of variations, alterations, substitutions or equivalent arrangements not heretofore described, but which are commensurate with the scope of the disclosure. Additionally, while various examples of the disclosure have been described, it is to be understood that aspects of the disclosure may include only some of the described examples. Accordingly, the disclosure is not to be seen as limited by the foregoing description, but is only limited by the scope of the appended claims.

What is claimed is:

1. A passenger conveyance system (2) comprising:
a first component (12) arranged to rotate about a first rotation axis ($A_1$) and a second component (16) arranged to rotate about a second rotation axis ($A_2$);
at least one magnet (20); and
at least one sensor (24);
wherein either the at least one sensor (24) or the at least one magnet (20) is fixed to the first component (12),
wherein the sensor (24) is arranged to measure a displacement to the at least one magnet (20), and the system (2) is arranged to use the measured displacement to determine information indicative of the alignment of the first and second components (12, 16).

2. The passenger conveyance system (2) of claim 1, comprising a plurality of sensors (24) each arranged to measure a displacement to the at least one magnet (20).

3. The passenger conveyance system (2) of claim 2, comprising at least three sensors (24) each arranged to determine a displacement to the magnet (20).

4. The passenger conveyance system (2) of claim 1, comprising a plurality of first component magnets (20) fixed to the first component (12), wherein the sensor (24) is arranged to measure a displacement to each of the plurality of first component magnets (20), and the passenger conveyance system (2) is arranged to use the measured displacement to each of the plurality of first component magnets (20) to determine the information indicative of the alignment of the first and second components (12, 16).

5. The passenger conveyance system (2) of claim 1, wherein the at least one magnet is a first component magnet (20) fixed to the first component and the passenger conveyance system (2) further comprises at least one second component magnet (22) fixed to the second component (16), wherein the system (2) is arranged to measure a displacement to the second component magnet (22) and to use the measured displacements to both the first and second component magnets (20, 22) to determine the information indicative of the alignment of the first and second components (12, 16).

6. The passenger conveyance system (2) of claim 5, comprising a plurality of second component magnets (22) fixed to the second component (16), wherein the passenger conveyance system (2) is arranged to measure a displacement to each of the plurality of second component magnets (22) and to use the measured displacements to each of the second component magnets (22) to determine the information indicative of the alignment of the first and second components (12, 16).

7. The passenger conveyance system (2) of claim 5, wherein the sensor (24) is arranged to measure a first displacement to the first component magnet (20) and a second displacement to the second component magnet (22).

8. The passenger conveyance system (2) of claim 5, wherein the at least one sensor (24) comprises a first component sensor (24) arranged to measure a displacement to the at least one first component magnet (20) and a second component sensor (26) arranged to measure a displacement to the at least one second component magnet (22).

9. The passenger conveyance system (2) of claim 8, comprising a plurality of second component sensors (26) each arranged to measure a displacement to the second component magnet (22).

10. The passenger conveyance system (2) of claim 1, wherein the first and second axes of rotation ($A_1$, $A_2$) are parallel.

11. The passenger conveyance system (2) of claim 1, wherein the first and second components (12, 16) are coaxial.

12. The passenger conveyance system (2) of claim 1, wherein the sensor (24) comprises a magneto-inductive sensor.

13. The passenger conveyance system (2) of claim 1, further comprising a processing device (32) arranged to use the measured displacement(s) to determine the information indicative of the alignment between the first and second components (12, 16).

14. The passenger conveyance system (2) of claim 1, comprising a monitoring device (34) arranged to output the information indicative of the alignment between the first and second components (12, 16).

15. A method of monitoring a passenger conveyance system (2), the passenger conveyance system (2) comprising:
- a first component (12) arranged to rotate about a first rotation axis ($A_1$) and a second component (16) arranged to rotate about a second rotation axis ($A_2$);
- at least one magnet (20); and
- at least one sensor (24),
- wherein either the at least one sensor (24) or the at least one magnet (2) is fixed to the first component (12);

the method comprising:
- measuring a displacement to the at least one magnet (20) using the at least one sensor (24); and
- using the measured displacement to determine information indicative of the alignment of the first and second components (12, 16).

\* \* \* \* \*